United States Patent [19]

Dukas, Jr.

[11] Patent Number: 4,955,581

[45] Date of Patent: Sep. 11, 1990

[54] BELLOWS SEALED PLUG VALVE

[75] Inventor: Stephen J. Dukas, Jr., Idaho Falls, Id.

[73] Assignee: United States Department of Energy, Washington, D.C.

[21] Appl. No.: 414,359

[22] Filed: Sep. 29, 1989

[51] Int. Cl.[5] .................... F16K 41/10; F16K 31/50; F16K 31/54

[52] U.S. Cl. .................. 251/214; 251/229; 251/250; 251/278; 251/315; 251/335.3

[58] Field of Search .............. 251/214, 229, 250, 276, 251/278, 309, 315, 335.3, 129.01, 58, 59

[56] References Cited

U.S. PATENT DOCUMENTS

| | | | |
|---|---|---|---|
| 1,381,873 | 6/1921 | Hardy | 251/214 |
| 2,308,183 | 1/1943 | Lewis et al. | 251/335.3 |
| 2,662,722 | 12/1953 | Graziano | 251/335.3 |
| 2,744,720 | 5/1956 | Wilms | 251/335.3 |
| 2,993,504 | 7/1961 | Sizer | 251/315 |
| 3,096,966 | 7/1963 | McFarland, Jr. | 251/335.3 |
| 3,784,156 | 1/1974 | Paetzel et al. | 251/250 |
| 4,231,545 | 11/1980 | Nelimarkka | 251/335.3 |
| 4,270,727 | 6/1981 | Norman | 251/335.3 |
| 4,462,422 | 7/1984 | Owoc et al. | 251/335.3 |
| 4,688,601 | 8/1987 | Astill | 251/335.3 |

FOREIGN PATENT DOCUMENTS

| | | | |
|---|---|---|---|
| 3723835 | 1/1989 | Fed. Rep. of Germany | 251/335.3 |
| 805910 | 12/1936 | France | 251/335.3 |

Primary Examiner—George L. Walton
Attorney, Agent, or Firm—Robert J. Fisher; Thomas G. Anderson; William R. Moser

[57] ABSTRACT

A bellows sealed plug valve includes a valve body having an inlet passage and an outlet passage, a valve chamber between the inlet and outlet passages. A valve plug has substantially the same shape as the valve chamber and is rotatably disposed therein. A shaft is movable linearly in response to a signal from a valve actuator. A bellows is sealingly disposed between the valve chamber and the valve actuator and means are located between the bellows and the valve plug for converting linear movement of the shaft connected to the valve actuator to rotational movement of the plug. Various means are disclosed including helical thread mechanism, clevis mechanism and rack and pinion mechanism, all for converting linear motion to rotational motion.

10 Claims, 3 Drawing Sheets

BELLOWS SEALED PLUG VALVE

CONTRACTUAL ORIGIN OF THE INVENTION

The United States Government has rights in this invention pursuant to Contract No. DE-AC07-84ID12435 between the U.S. Department of Energy and Westinghouse Idaho Nuclear Company, Inc.

BACKGROUND OF THE INVENTION

The present invention relates to an improved bellows sealed ¼ turn valve in which the linear movement of a valve actuator shaft is converted to rotational movement of the ¼ turn between the valve and the bellows seal to provide enhanced valve integrity.

A ¼ turn valve, sometimes referred to as a ball valve when the plug is so shaped, comprises a valve body with an inlet passage, an outlet passage and a valve chamber between the inlet and outlet passages. The valve chamber generally has the shape of a body of revolution such as a sphere, a cylinder, or the frustum of a cone, with its axis of rotation usually perpendicular to the inlet and outlet passages which are usually colinear. A valve plug shaped generally to conform to the shape of the valve chamber is rotatably disposed within the chamber. The valve plug is generally a solid body with a flow passage therethrough. The flow passage is positioned such that when the valve plug is in an open position the flow passage is aligned to provide fluid communication between the inlet and outlet passages. When the valve plug is rotated to a closed position usually at a position 90° from the open position, a ¼ turn, the flow passage is not aligned with the inlet and outlet passages, and solid portions of the valve plug interrupt fluid communication therebetween. A complete practical ¼ turn valve also includes connecting means such as threads or flanges at the openings of the inlet and outlet passages so that the valve may be connected into a fluid pipeline or a conduit to provide control of fluid flow therein. A ¼ turn valve also includes rotating means so that the valve plug may be rotated between the open and closed positions. The rotating means usually is a valve stem extending through the valve body and sealed with packing in a manner well known in the art. Most ¼ turn valves, mainly ball valves, have elastomeric seals to enhance the sealing properties, so that leakage from passageways cannot communicate through the valve cavity. Previously, the valve stem was rotated manually, or was controlled, but in hazardous environments valve actuation is usually remotely controlled.

¼ turn valves of the type described are often used in chemical processing applications such as in nuclear fuel processing plants. In such plants, ¼ turn valves are used for cell wall block valves or they may be used in pipelines containing nitric acid, hydrofluoric acid, sulfuric acid or sodium-hydroxide, or where there is present hydrogen sulfide contaminated petroleum and radioactively contaminated fluids, biologically sterile fluids, and where vacuum leakage is critical. Often in such plants the materials which are controlled by the ¼ turn valves are toxic so that the sealing requirements for such valves are of a higher degree than in the normal commercial situation. In such a case, it is common for bellows sealed ¼ turn valves to be used because the bellows sealed ¼ turn valves are hermetically seal welded as the primary seal in the valve. Some advantages of ¼ turn valves are low maintenance, high reliability, and the ability for a full-ported flow passage, resulting in minimum fluid pressure drop across the valve. Secondary seals are of the traditional sort including elastomeric gaskets and the like. Heretofore, ¼ turn valves when used with bellows seals have not had mechanisms available to change linear motion to rotational motion between the valve body and the bellows. The use of hermetic bellows sealed values is important because it permits the contaminated materials to be sealed by metal bellows which are more likely to retain their integrity for a longer life span, an important feature when hundreds of such valves are used in a single plant, a when the contaminated nature of the environment is considered with the attendant problems of changing or repairing faulty valves.

Accordingly, it is an object of the present invention to provide a bellows sealed ¼ turn valve wherein means are provided for translating linear motion to rotational motion between the bellows seal and the valve body.

SUMMARY OF THE INVENTION

To achieve the foregoing and other objects in accordance with the purpose of the present invention as embodied and broadly described herein, this invention may comprise a bellows sealed ¼ turn valve including a valve body having an inlet passage and an outlet passage, a valve chamber between the inlet and outlet passages, a valve plug having substantially the same shape as the valve chamber and being rotatably disposed therein, the valve plug having a flow passage therethrough, the flow passage disposed such that with the valve plug in a first position the flow passage is in alignment with the inlet and the outlet passages and provides fluid communication therebetween, and with the valve plug in a second position the flow passage is out of alignment with the inlet and outlet passages and the valve plug interrupts fluid communication therebetween, a shaft connected to a valve actuator movable linearly in response to a signal from the valve actuator, and a bellows sealingly disposed between the valve chambers and the valve actuator, the improvement consisting of means between the bellows and the valve plug for converting linear movement of the shaft connected to the valve actuator to rotational movement of the plug between the first and second positions thereof.

The invention may also comprise an improved ¼ turn operator valve including a valve body having an inlet passage and an outlet passage, a valve chamber between the inlet and outlet passages, a valve plug having substantially the same shape as the valve chamber and being rotatably disposed therein, the valve plug having a flow passage therethrough, the flow passage disposed such that with the valve plug in a first position the flow passage is in alignment with the inlet and the outlet passages and provides fluid communication therebetween, and with the valve plug in a second position the flow passage is out of alignment with the inlet and outlet passages and the valve plug interrupts fluid communication therebetween, a shaft connected to a valve actuator movable linearly in response to a signal from the valve actuator, wherein the improvement comprises a cylindrical shaped member sealingly connected by bellow means to the valve chamber, a valve operator shaft passing through the cylindrical member in contact with the shaft responsive to the valve actuator and connected to the valve plug, and mating helical threads o one of the valve operator shaft and the cylindrical member providing rotation to the valve plug upon linear reciprocal movement of the shaft responsive to the valve actuator, whereby a signal from the valve actuator resulting in linear movement of the shaft responsive thereto and rotational movement of the valve operator shaft and the valve plug between the first and second positions thereof.

The invention may further comprise an improved ¼ turn operator valve including a valve body having an inlet passage and an outlet passage, a valve chamber between the inlet and outlet passages, a valve plug having substantially the same shape as the valve chamber and being rotatably disposed therein, the valve plug having a flow passage therethrough, the flow passage disposed such that with the valve plug in a first position the flow passage is in alignment with the inlet and the outlet passages and provides fluid communication therebetween, and with the valve plug in a second position the flow passage is out of alignment with the inlet and outlet passages and the valve plug interrupts fluid communication therebetween, a shaft connected to a valve actuator movable linearly in response to a signal from the valve actuator, wherein the improvement comprises a cylindrical member sealingly connected by bellow means to the valve chamber, a valve operator shaft passing through the cylindrical member in contact with the shaft responsive to the valve actuator and connected to the valve plug, and means connected to the valve operator shaft providing rotation to the valve plug upon linear reciprocal movement of the shaft responsive to the valve actuator, whereby a signal from the valve actuator resulting in linear movement of the shaft responsive thereto and rotational movement of the valve plug between the first and second positions thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

The following is a detailed description of the preferred embodiment of the invention. Other embodiments will be readily apparent to those skilled in the art.

Figure 1:
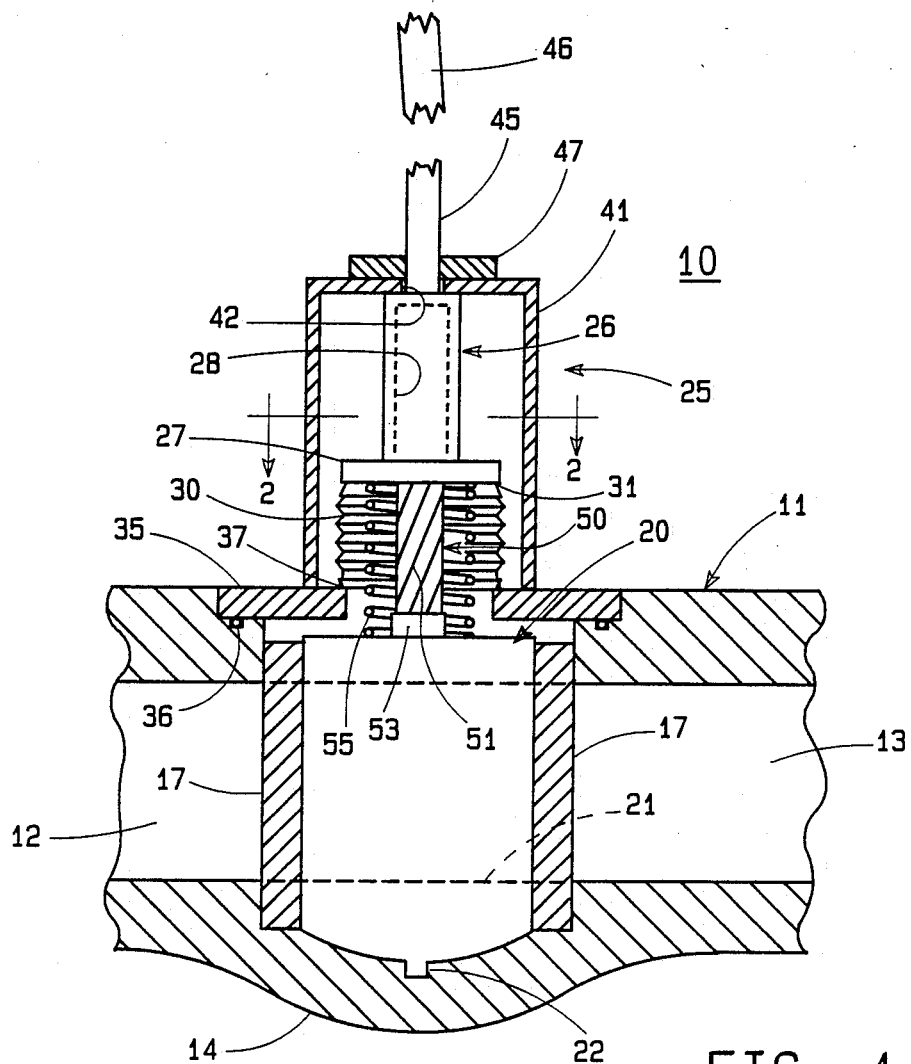
FIG. 1 is a cross-sectional view of a first embodiment of the present invention showing a spiral actuated plug valve.
Figure 2:
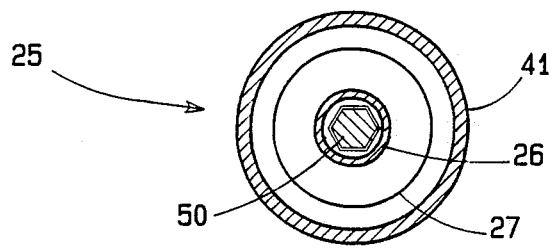
FIG. 2 is a view in section of the valve illustrated in FIG. 1 as seen along line 2—2 thereof.

Referring now to FIGS. 1 and 2 there is shown an actuator valve 10 including a valve body 11 with an inlet passage 12 and an outlet passage 13. The valve body 11 has a arcuate body portion 14 into which are fitted spaced apart parallel valve seats 17 defining a valve chamber therebetween. A valve plug 20 is provided with a passageway 21 which in general aligns with the inlet 12 and the outlet 13 in the view shown in FIG. 1 so as to provide a passageway for fluid to flow from the inlet to the outlet. When the valve 20 is rotated 90° or ¼ turn then the valve body or plug 20 interrupts communication between the inlet 12 and the outlet 13 so as to prevent flow through the valve 10. The valve body 20 may be provided with a trunnion 22 which fits into a notch in the arcuate portion 14 of the valve body 11, if necessary for the particular operation. The trunnion 22 forms no part of the invention.

The valve cap assembly 25 is provided to enclose and seal the valve 10. The valve cap assembly 25 is an integral part of the invention and is particularly important when the material going through the operator valve 10 includes toxic materials such as nuclear waste products or other materials encountered in the reprocessing of nuclear fuel.

The cap assembly 25 includes a cylindrical collar 26 which has integrally connected a circular flange 27, the interior of the collar 26 being provided with helical or spiral threads or bearings as at 28. A metallic bellows 30 is welded at one end 31 to the flange 27. A seating flange 35 is positioned within a countersunk area in the valve body 11 and is sealed by a typical O-ring seal 36 or welded. The seating flange 35 has the other end 37 of the bellows 30 welded thereto so as to provide a hermetic seal between the valve body 11 and the flange 27 which is sealingly connected to the cylindrical collar assembly 26. In this manner, the bellows 30 serves to provide an important integral seal for valves 10 of the type herein disclosed useful for nuclear waste processing or other industrial processing involving hazardous materials or to prevent contamination of products, i.e., biological or semi-conductors.

A secondary cap assembly 41 in the form of a cylinder having a larger diameter than the collar assembly 26 is connected also at one end to the seating flange 35 and is provided at the other end with an aperture 42 through which passes an actuator shaft 45 connected, as shown schematically to an actuator 46 and sealed by a packing or secondary seal 47 either outside of or within the secondary cap assembly 41. An operator shaft 50 with external helical threads 51 is dimensioned to engage the helical threads 28 on the inside of the cylindrical collar assembly 26 such that linear motion of the shaft 50 causes rotation thereof due to engagement of the helical threads 28 and 51. It is intended in this context that any portion of a thread no matter how small which causes the rotation of the shaft 50 is to be included by the terms "helical threads" or the term "engaged helical threads." The other end of the shaft 50 is connected as at 53 to the top of the plug 20 so that when the actuator 46 causes the shaft 45 to move linearly, the plug 20 is caused to rotate the ¼ turn previously discussed by the cooperation of the helical threads 28 and 51.

Finally, a spring 55 is provided within the bellows 30 and bears against the plug 20 on one end and the flange 27 at the other end so as to maintain the plug 20 in a fully seated condition to return the valve 11 to the relaxed or failed condition. The spring 55 may be exterior to the bellows 30.

Figure 3:
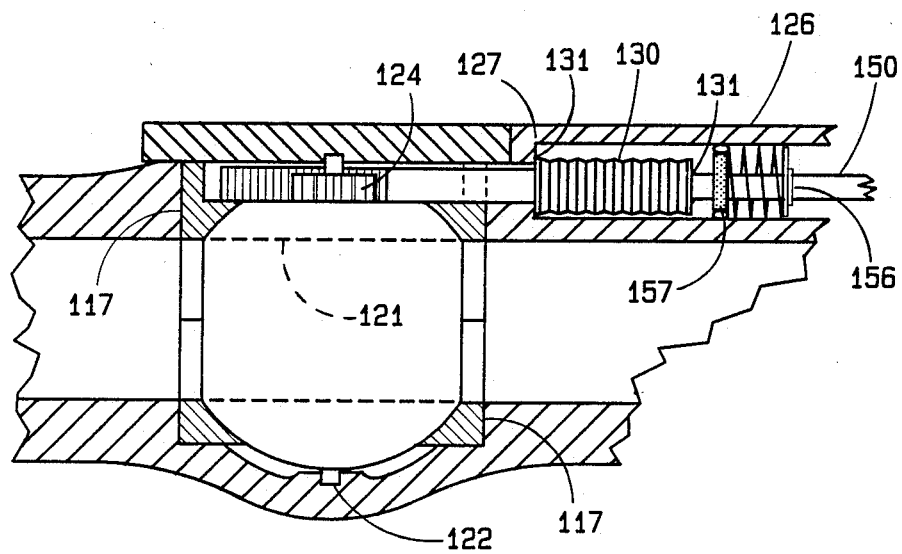
FIG. 3 is a side view of a second embodiment of the invention.
Figure 4:
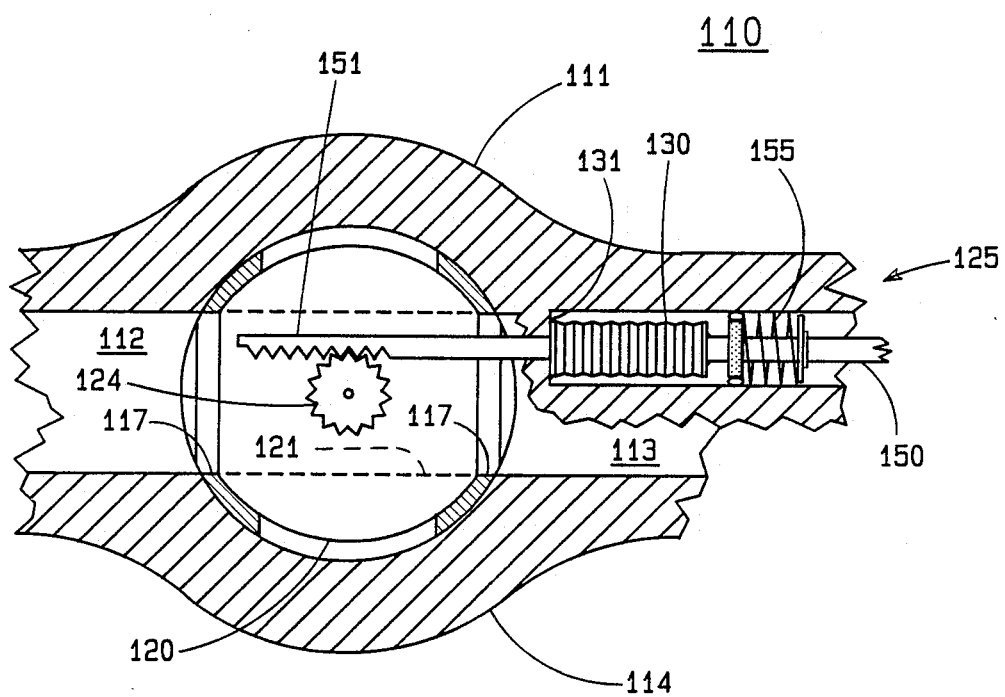
FIG. 4 is a view of the valve illustrated in FIG. 3 with the top bonnet removed.

Referring now to FIGS. 3 and 4, there is disclosed a second embodiment of the invention in which the rotational movement is provided by a rack and pinion.

Referring now to FIGS. 3 and 4 there is an operator valve 110 having a valve body 111 with an inlet 112 and an outlet 113 interconnected by an arcuate body portion 114 housing a pair of opposed valve seats 117 defining a valve chamber. A plug 120 having a passageway 121 is interposed between the inlet 112 and the outlet 113 as heretofore described, the plug 120 may be provided, as shown, with a trunnion 122 as is well known. At the top of the valve plug 120 is a pinion 124 which is fixedly connected to the valve plug 120 as by welding or by any other satisfactory means. A valve cap assembly 125 includes a housing portion 126 which may be integral with the valve body 111 or may be separate therefrom terminating at one end in a shoulder 127. Metallic bellows 130 is sealingly connected to the shoulder 127 and at the other end by weld 131 to an operator shaft 150. The operator shaft 150 extends through the bellows 130 and terminates in a rack 151 which is dimensioned to mesh with the pinion 124. Finally, a spring 155 bears against a packing material 157 at one end and a spring retainer 156 at the other end. The operation of the operator valve 110 is similar to the operation of the operator valve 10 in that linear movement of the shaft 150 causes rotational movement of the plug 120 and this rotational movement is provided by means which is located intermediate the bellows 130 and the valve chamber so as to provide the most effective sealing means in a bellows sealed valve useful in processing radioactive or other hazardous waste products. Dual rack and pinion mechanisms on each side of the plug 120 to equalize the forces applied to the pinion 124 may be desirable.

Figure 6:
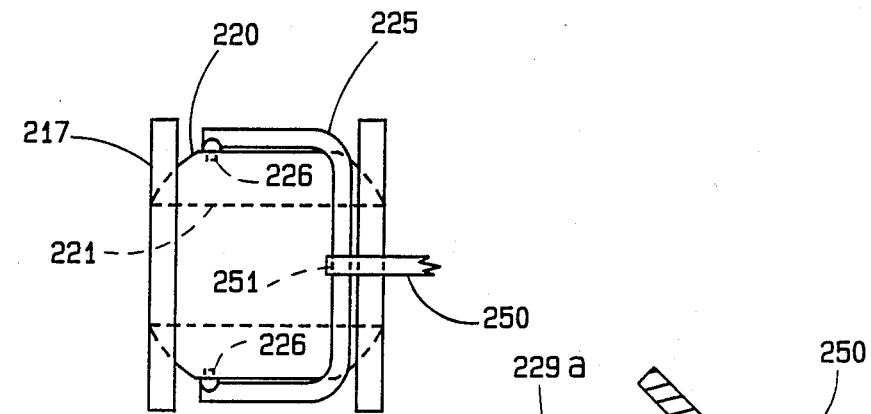
FIG. 6 is an enlarged view of the clevis and plug assembly of the embodiment illustrated in FIG. 5.
Figure 5:
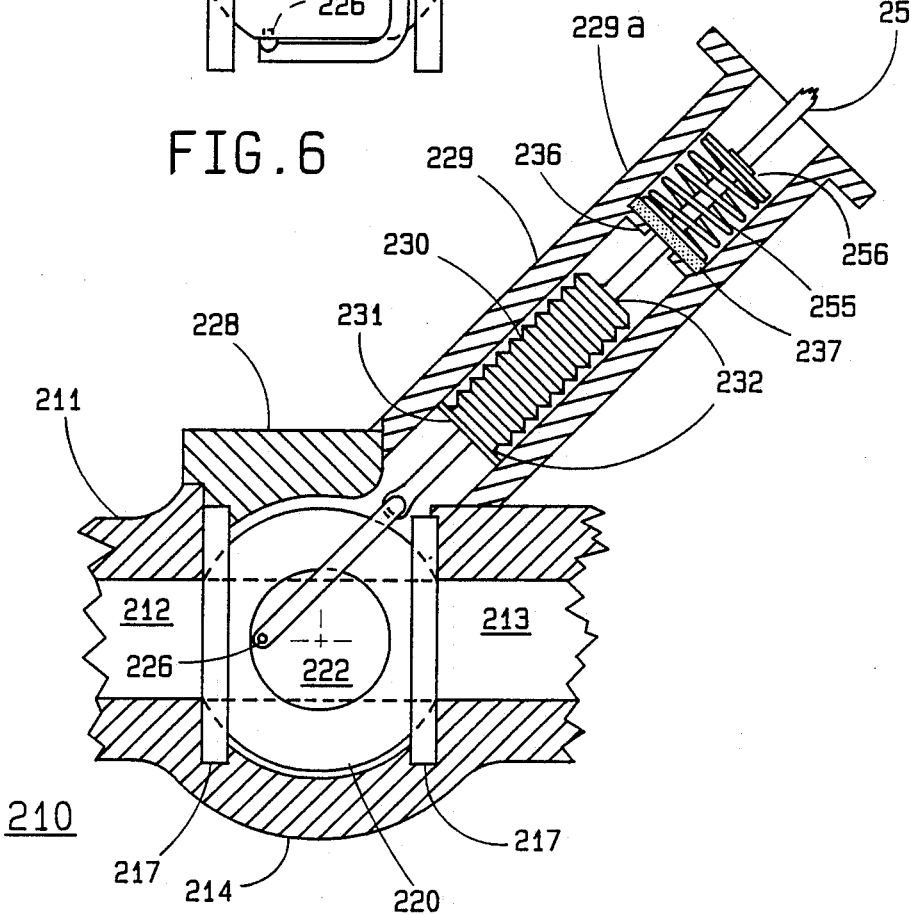
FIG. 5 is another embodiment of the present invention.

Referring now to FIGS. 5 and 6 there is shown yet another embodiment of the present invention in which an operator valve 210 includes a valve body 211 having a valve inlet passageway 212 and an outlet passageway 213 interconnected by an arcuate portion 214 of the valve body 211. Located in the arcuate portion 214 are a pair of opposing valve seats 217 which are dimensioned to receive a plug 220 which may be cylindrical or ball shaped. The plug 20 has a passageway 221 of the same dimensions as the inlet and outlets 212 and 213 respectively so that the valve plug 220 serves to provide both communication and interruption between the respective passageways. Finally, the plug 220 also includes opposed flat surfaces 222 for a purpose hereinafter set forth. A clevis 225 is pivotally mounted as at 226 to the opposed flat faces 222 of the ball or plug 220, for a purpose hereinafter set forth.

A bonnet 228 overlies the top of the valve body 211 and is integral with a housing 229 and valve housing sleeve 229a in the form of a cylindrical member integrally connected to the valve body 211 angularly extending away therefrom. Inside the housing 229 is positioned a metallic bellows 230 sealed at one end thereof to a stem guide 231 and sealed at the other end thereof to an operator shaft 250 by means of the weld 232. Away from the valve plug 220 is a flange 236 on which is positioned secondary packing 237 and a spring 255 which is retained on the shaft 250 by means of a spring clip 256. The operator shaft 250 is pivotally connected to the clevis 225 by having the bight portion of the clevis pass through an aperture 251 in the operator shaft 250.

The operation of the operator valve 210 is essentially the same as the previous two embodiments. That is the linear movement of the actuator shaft 250 results in rotational movement of the plug 220 so as to provide communication between the inlet and outlet passageways 212, 213, respectively, or to interrupt communication between the same. In both embodiments hereinbefore disclosed as well as the present embodiment, the means for converting the linear movement of the actuator rod to the rotational movement of the plug in the valve chamber is between the bellows seal and the valve so as to provide secure sealing mechanism of the bellows plug valve which may contain a hazardous or sterile material.

While there has been disclosed what is considered to be the preferred embodiment of the present invention, it is understood that various changes in the details may be made without departing from the spirit, or sacrificing any of the advantages of the present invention.

The embodiments of this invention of which an exclusive property or privilege is claimed are defined as follows:

1. An improved ¼ turn operator valve including a valve body having an inlet passage and an outlet passage, a valve chamber between said inlet and outlet passages, a valve plug having substantially the same shape as said valve chamber and being rotatably disposed therein, said valve plug having a flow passage disposed therethrough, said flow passage disposed such that with said valve plug in a first position said flow passage is in alignment with said inlet and said outlet passages and provides fluid communication therebetween, and with said valve plug in a second position said flow passage is out of alignment with said inlet and outlet passages and said valve plug interrupts fluid communication therebetween, a shaft connected to a valve actuator movable linearly in response to a signal from said valve actuator, wherein the improvement comprises:

a cap assembly, an actuator shaft passing through said cap assembly, a secondary sealing member encircling said actuator shaft, a collar assembly in contact with said actuator shaft and responsive to linear motion of said actuator shaft, an operator shaft adapted to receive a torsional force from said collar assembly, a bellows cooperating with said collar assembly and said cap assembly to form a primary sealing assembly isolating said valve chamber from said actuator shaft to prevent fluids from passing between said collar assembly and said bellows, a valve plug connected to said operator shaft and a return position spring encircling said operator shaft;

said collar assembly includes a cylindrical member encircling said operator shaft and a flange member attached to said cylindrical member and said bellows, and wherein said torsional force is provided by helical threads on said cylindrical member and said operator shaft causing rotation of said valve plug upon linear reciprocal movement of said actuator shaft; and wherein said cap assembly includes sealing flange, and sealing means thereby effecting a fluid tight seal between said valve body and said sealing flange.

2. The operator valve of claim 1, wherein the plug is a ball and the valve is complementary shaped.

3. An improved ¼ turn operator valve including a valve body having an inlet passage and an outlet passage, a valve chamber between said inlet and outlet passages, a valve plug having substantially the same shape as said valve chamber and being rotatably disposed therein, said valve plug having a flow passage disposed therethrough, said flow passage disposed such that with said valve plug in a first position said flow passage is in alignment with said inlet and said outlet passages and provides fluid communication therebetween, and with said valve plug in a second position said flow passage is out of alignment with said inlet and outlet passages and said valve plug interrupts fluid communication therebetween, a shaft connected to a valve actuator movable linearly in response to a signal from said valve actuator, wherein the improvement comprises:

- a cap assembly, an operator shaft passing through said cap assembly, a bellows cooperating with said operator shaft and said cap assembly to prevent fluids from passing between said bellows and said operator shaft and to form a primary sealing assembly isolating said valve chamber from the atmosphere, a secondary sealing means and a spring retainer encircling said operator shaft, a flange in contact with said secondary sealing means and encircling said operator shaft, a return position spring encircling said operator shaft and positioned between said secondary sealing means and said spring retainer, means connected to said operator shaft providing rotation to said valve plug upon linear reciprocal movement of said operator shaft; and
- wherein said cap assembly includes a valve housing sleeve and a stem guide, and said bellows is cooperating with said cap assembly at said stem guide thereby effecting a fluid tight seal between said stem guide and said bellows.

4. The improved ¼ turn operator valve of claim 3, wherein a clevis interconnects said valve plug with said valve operator shaft.

5. The improved ¼ turn operator valve of claim 3, wherein the valve operator shaft is connected to a clevis, said valve plug is a ball and said clevis is connected eccentrically to said ball.

6. The improved ¼ turn operator valve of claim 3, wherein said plug valve has a pinion extending therefrom, said valve operator shaft has a rack thereon in engaging relationship with said pinion, linear movement of said valve operator shaft resulting in rotational movement of said pinion and said plug valve connected thereto.

7. The improved ¼ turn operator valve of claim 6, wherein the plug valve is a ball valve.

8. In a bellows sealed plug valve including a valve body having an inlet passage and an outlet passage, a valve chamber between said inlet and outlet passages, a valve plug having substantially the same shape as said valve chamber and being rotatably disposed therein, said valve plug having a flow passage disposed therethrough, said flow passage disposed such that with said valve plug in a first position said flow passage is in alignment with said inlet and said outlet passages and provides fluid communication therebetween, and with said valve plug in a second position said flow passage is out of alignment with said inlet and outlet passages and said valve plug interrupts fluid communication therebetween, a shaft connected to a valve actuator movable linearly in response to a signal from said valve actuator, wherein the improvement comprises:

- a cap assembly, an operator shaft passing through said cap assembly, a bellows cooperating with said operator shaft and said cap assembly to prevent fluids from passing between said bellows and said operator shaft and to form a primary sealing assembly isolating said valve chamber from the atmosphere, a secondary sealing means and a spring retainer encircling said operator shaft, a return position spring encircling said operator shaft and positioned between said secondary sealing means and said spring retainer, a pinion extending from said valve plug and in contact with said operator shaft;
- said operator shaft is adapted at one end to form a rack and interact with said pinion, whereby the linear movement of said operator shaft results in the rotational movement of said pinion and said valve plug connected thereto; and
- said cap assembly includes a cap, and a valve housing, and wherein said bellows cooperates with said cap assembly at a point along said valve housing and said operator shaft thereby effecting a fluid tight seal to prevent fluids from passing between said bellows and said operator shaft and said valve housing and said bellows. thereof.

9. The bellows sealed plug valve of claim 8, wherein the plug is a ball which is turned through an arc of about 90° between the first and second positions thereof.

10. The bellows sealed plug valve of claim 9, wherein said valve is spring biased to the closed position thereof.

* * * * *